United States Patent [19]

Ishikawa et al.

[11] Patent Number: 5,021,370
[45] Date of Patent: Jun. 4, 1991

[54] CERAMIC FIBERS AND A PROCESS FOR PRODUCING THE SAME

[75] Inventors: Toshikatsu Ishikawa, Tokyo; Haruo Teranishi, Machida; Hiroshi Ichikawa; Shiro Mitsuno, both of Yokohama, all of Japan

[73] Assignee: Nippon Carbon Co, Limited, Tokyo, Japan

[21] Appl. No.: 391,567

[22] PCT Filed: Nov. 25, 1988

[86] PCT No.: PCT/JP88/01197

§ 371 Date: Jul. 21, 1989

§ 102(e) Date: Jul. 21, 1989

[87] PCT Pub. No.: WO89/04884

PCT Pub. Date: Jun. 1, 1989

[30] Foreign Application Priority Data

Nov. 27, 1987 [JP] Japan ............................ 62-297780

[51] Int. Cl.$^5$ ............... C04B 35/56; C04B 35/58
[52] U.S. Cl. ........................... 501/95; 501/92; 501/96; 501/97

[58] Field of Search ................. 501/88, 92, 95, 96, 501/97, 99

[56] References Cited

U.S. PATENT DOCUMENTS

| 4,650,773 | 3/1987 | Okamura et al. | 501/95 |
| 4,743,662 | 5/1988 | Lipowitz | 501/88 |
| 4,761,389 | 8/1988 | Rabe et al. | 501/97 |
| 4,771,118 | 9/1988 | Takamizawa et al. | 501/88 |
| 4,869,854 | 9/1989 | Takeda et al. | 501/92 |
| 4,870,035 | 9/1989 | Takamizawa et al. | 501/88 |

FOREIGN PATENT DOCUMENTS 7305617 10/1973 Netherlands ................. 501/95

Primary Examiner—William R. Dixon, Jr.
Assistant Examiner—Anthony J. Green
Attorney, Agent, or Firm—Bucknam and Archer

[57] ABSTRACT

Ceramic fibers characterized by comprising a quaternary system composed of Si, C, N, and O and having a specific resistance of $10^6$ to $10^{10}$ $\Omega$·cm, and a suitable process for producing the ceramic fibers characterized by reacting infusible polycarbosilane fibers with ammonia and further heat treating the reaction product in an inert gas.

4 Claims, 3 Drawing Sheets

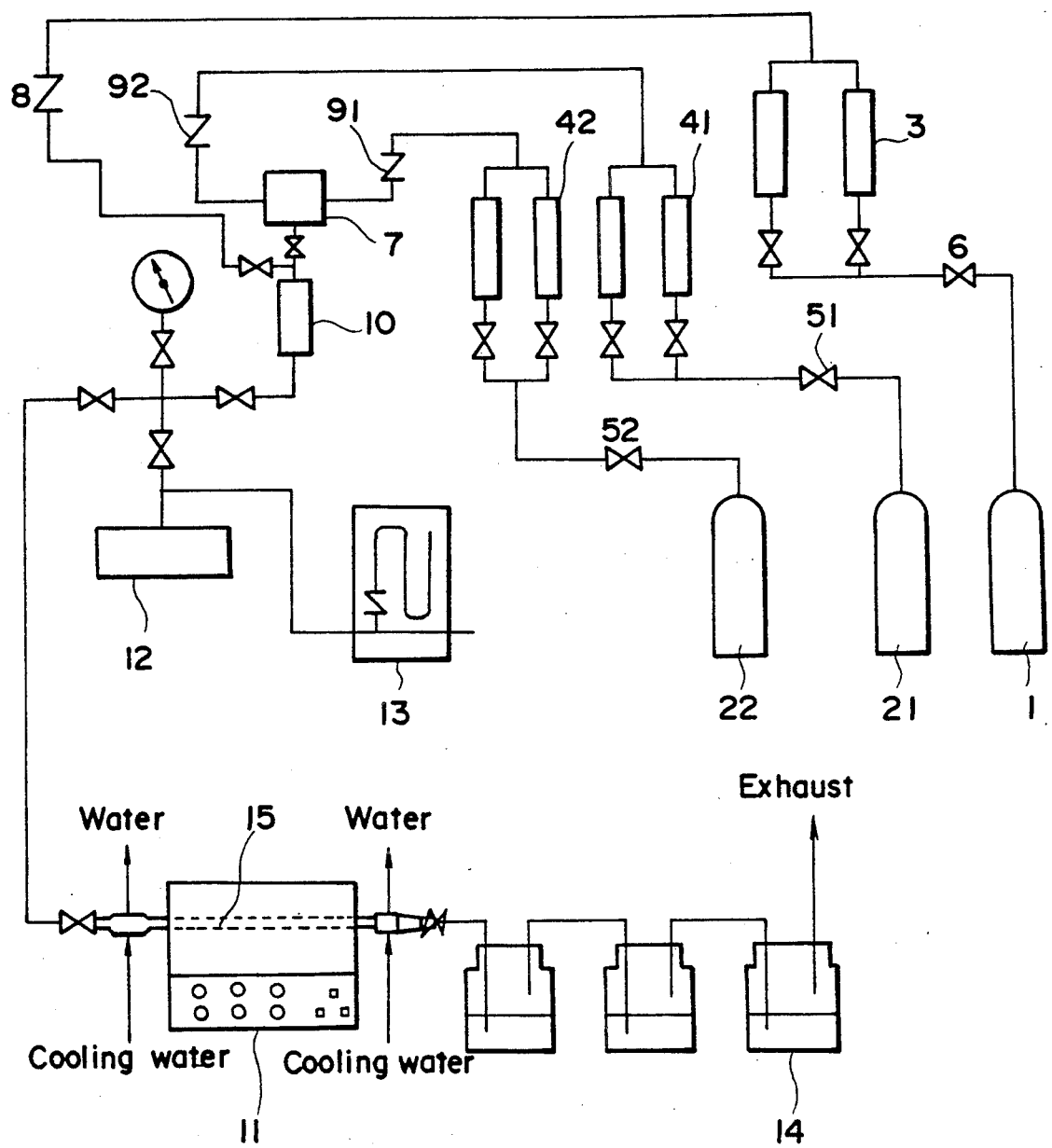
F I G. 1

CERAMIC FIBERS AND A PROCESS FOR PRODUCING THE SAME

DESCRIPTION

1. Technical Field

The present invention relates to ceramic fibers and a process for producing the same and more particularly to ceramic fibers comprising a quaternary system composed of Si, C, N and O, which are excellent in mechanical properties such as tensile strength and tensile modulus and in electrical properties such as electric resistance and permittivity, and it also relates to a process for producing the ceramic fibers.

2. Background Art

Conventional inorganic fibers obtained by using polycarbosilane as starting material, include SiC fibers (see Japanese Patent Nos. 1217464 and 1217465 and the like) and SiON fibers (see Japanese Patent Appln. Laid-Open No. (sho.) 61-12915 (12915/86)).

These conventional fibers have been used not only as reinforcing fibers for a fiber-reinforced metal, a fiber-reinforced plastics and the like, but also as an electric insulating material, a heat-resistant material and the like, because of their excellent properties.

Although the SiC fibers have excellent mechanical properties, they are electrically disadvantageous in that they have a specific resistance of $10^3$ to $10^5$ $\Omega \cdot cm$, they exhibit relatively large permittivity and dielectric loss when they are used in the form of a SiC fibers/resin composite material and they have inferior radio wave transmittivity, whereby they are rendered unsuitable for use as a radome or the like.

On the other hand, SiON fibers are advantageous in that they have a specific resistance exceeding $10^{10}$ $\Omega \cdot cm$, i.e., high electric insulating performance, exhibit lower relative permittivity and dielectric loss when used in the form of a resin composite material than those of the SiC fibers and have radio wave transmittivity superior to that of the SiC fibers. However, the SiON fibers raise a problem that their mechanical properties are inferior to those of the SiC fibers.

The primary object of the present invention is to solve the above-described problems and to provide ceramic fibers having excellent electrical and mechanical properties and a process for producing the same.

DISCLOSURE OF INVENTION

The present inventors have made various studies with a view to solving the above-described problems and, as a result, have found that the above-described problems can be solved by heat treating infusible polycarbosilane fibers in an ammonia gas atmosphere to nitride the fibers and further heat treating the thus obtained nitrided fibers in an inert gas or an atmosphere comprising 1 to 30% by volume of hydrogen chloride with the balance being an inert gas to obtain desired ceramic fibers. The present invention is based on this finding.

The ceramic fibers of the present invention are characterized by comprising a quaternary system composed of Si, C, N, and O.

It is the most desirable that the contents of the elements, i.e., Si, C, N, and O, in the ceramic fibers of the present invention are 40 to 60% by weight, 0.2 to 30% by weight, 5 to 30% by weight, and 5 to 20% by weight, respectively. When the content of each of the elements is in the above-described corresponding range, the ceramic fibers exhibit excellent electrical and mechanical properties, i.e., a specific resistance of $10^6$ to $10^{10}$ $\Omega \cdot cm$, a tensile strength of 300 to 450 kg/mm$^2$, a tensile modulus of 20 to 40 ton/mm$^2$, a relative permittivity of 3.0 to 4.0 when in the form of an epoxy resin composite material (percentage volume of fibers: 55%), and a dielectric loss of 0.02 or less when in the form of said composite material.

BRIEF DESCRIPTION OF DRAWINGS

FIG. 1 is a flow sheet showing an example of the process for producing ceramic fibers according to the present invention;

BEST MODE FOR CARRYING OUT THE INVENTION

Figure 2:
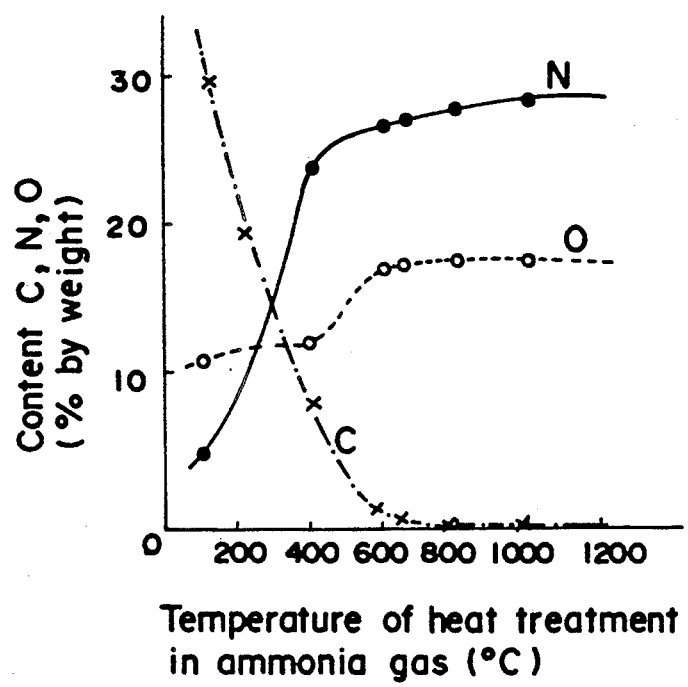
FIG. 2 is a graph showing the relationship between the content of each component and the temperature of heat treatment in an ammonia gas in Example 1.

A preferred embodiment of the process for producing ceramic fibers according to the present invention will now be described in detail with reference to the accompanying drawings.

FIG. 1 is a flow sheet showing an example of the process for producing ceramic fibers according to the present invention. In FIG. 1, reference numeral 1 designates an ammonia gas bomb, numeral 21 a bomb for an inert gas such as argon or nitrogen gas, numeral 22 a hydrogen chloride gas bomb, numerals 3, 41 and 42 each a gas blender, numerals 8, 91 and 92 each a pressure regulator, numeral 10 a flow rate regulator, numeral 11 a firing furnace, numeral 12 a vacuum pump, numeral 13 a manometer, numeral 14 a gas washing bottle, and numeral 15 a reaction tube.

In the process according to the present invention, polycarbosilane fibers obtained by continuous spinning are first made infusible by oxidizing the fibers with an oxidizing gas such as air or oxygen thereby to prevent the fibers from being fused in the second firing step which will be described later. The treatment for making the fibers infusible may be carried out, for example, by treating the fibers in the reaction tube 15 of the firing furnace 11 shown in FIG. 1, in an oxidizing atmosphere such as air or oxygen, at a temperature of 50° to 400° C. for several min. to 10 hr.

The infusible fibers thus obtained are then heat treated in an ammonia gas atmosphere at 100° to 600° C. for 0.5 to 6 hr to allow the fibers to react with ammonia (this treatment being referred to as ("the first firing step"). In this step, the device for the treatment is evacuated to a predetermined degree of vacuum with the vacuum pump 12 while monitoring the degree of vacuum with the manometer 13, and ammonia gas is supplied into the device from the ammonia gas bomb 1 through the valve 6, the flowmeter 3 and the flow rate regulator 10 to form an ammonia gas atmosphere within the device. The ammonia gas is regulated to have a given flow rate with the flow rate regulator 10. The flow rate of the ammonia gas is preferably 10 to 500 ml/min.

After an ammonia gas atmosphere is formed within the device, the infusible fibers are heat treated in the firing furnace 11 at a temperature of 100° to 600° C. When the heat treatment is conducted at a temperature below 100° C., no ceramic fibers having a sufficiently high nitrogen content can be produced. On the other hand, when the heat treatment is conducted at a temperature exceeding 600° C., ceramic fibers to be formed by the subsequent second firing will undesirably degrade in mechanical properties such as tensile strength.

Then, the fibers thus heat treated in ammonia gas is further heat treated in an inert gas, such as nitrogen or argon gas, at a temperature up to 1600° C. for 0.5 to 6 hr to prepare amorphous continuous ceramic fibers comprising Si, C, N, and O (this treatment being referred to as "the second firing step"). In this step, as in the first firing step, the device is evacuated to a predetermined degree of vacuum with the vacuum pump 12 while monitoring the degree of vacuum with the manometer 13, and an inert gas is supplied into the device from the nitrogen or argon gas bomb 21 through the valve 51, the flowmeter 41 and the flow rate regulator 10 to form an inert gas atmosphere within the device. The inert gas is regulated to have a given flow rate with the flow rate regulator 10. The flow rate of the inert gas is preferably 200 to 2500 ml/min.

After an inert gas atmosphere is formed within the device, the fibers from the first firing step are heat treated in the firing furnace 11 at a temperature up to 1600° C. to obtain desired ceramic fibers. When the heat treatment is conducted at a temperature exceeding 1600° C., particles of Si-N and Si-C in the fibers are grown into ones having an excessively large size, whereby the resulting ceramic fibers will undesirably degrade in the strength.

Further, the above-described inert gas may be partly replaced with hydrogen chloride gas which is supplied from the hydrogen chloride gas bomb 22 through the valve 52 and the flow meter 42 into the gas blender 7 to prepare a mixed gas consisting of 1 to 30% by volume of hydrogen chloride gas with the balance being the inert gas. The mixed gas so prepared may be flowed at a rate of 10 to 500 ml/min to conduct the heat treatment at a temperature up to 1600° C. In this case, the adjustment of the hydrogen chloride content of the mixed gas enables the average value and variation of the C content of the resulting ceramic fibers to be controlled, which makes it possible to prepare homogeneous ceramic fibers. When the hydrogen chloride content of the mixed gas is less than 1% by volume, no favorable effect can be attained. A hydrogen chloride content exceeding 30% by volume is also unfavorable because the N or C component in the fibers is reduced, so that the strength of the ceramic fibers obtained is lowered.

As described above, in the present invention, ceramic fibers comprising Si, C, N, and O in respective predetermined amounts can be produced by reacting infusible polycarbosilane fibers with ammonia at 100° to 600° C. and further heat treating the reaction product in an inert gas or an atmosphere comprising 1 to 30% by volume of hydrogen chloride with the balance being an inert gas at a temperature up to 1600° C. Said ceramic fibers have electrical and mechanical properties superior to those of th conventional SiC and SiON fibers.

EXAMPLES

The present invention will now be described in more detail with reference to the following Examples and Comparative Examples.

EXAMPLE 1

Polycarbosilane (average molecular weight of about 2000; melting point of 220° to 230° C.) was melt spun and then made infusible at 180° C. for 1 hr in air to obtain infusible polycarbosilane fibers. The infusible fibers were heat treated in ammonia gas (at a flow rate of 200 ml/min) at 100° C., 400° C., and 600° C. for 1 hr to obtain samples heat treated at different temperatures, respectively. Each of the samples was heat treated at 1200° C. for 1 hr in nitrogen gas (at a flow rate of 2000 ml/min) to obtain three kinds of ceramic fibers.

COMPARATIVE EXAMPLE 1

The same infusible polycarbosilane fibers as those used in Example 1 were heat treated respectively at 650° C., 800° C., and 1000° C. for 1 hr under similar conditions to those of Example 1 and further heat treated at 1200° C. for 1 hr in the same nitrogen atmosphere as that of Example 1, thereby preparing three kinds of ceramic fibers heat treated at the different temperatures especially in the first firing step.

Figure 3:
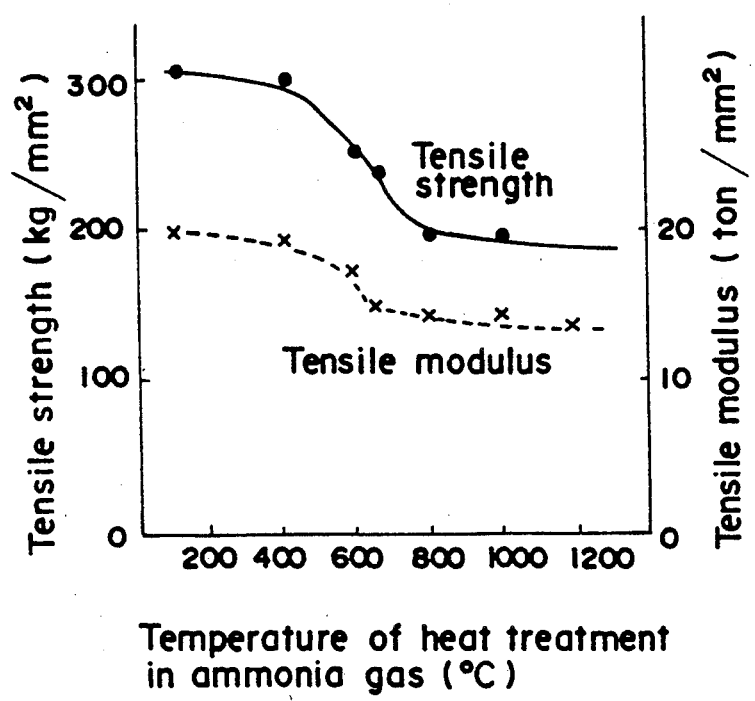
FIG. 3 is a graph showing the relationship between each of the tensile strength and tensile modulus, and the temperature of heat treatment in ammonia gas in Example 1.
Figure 4:
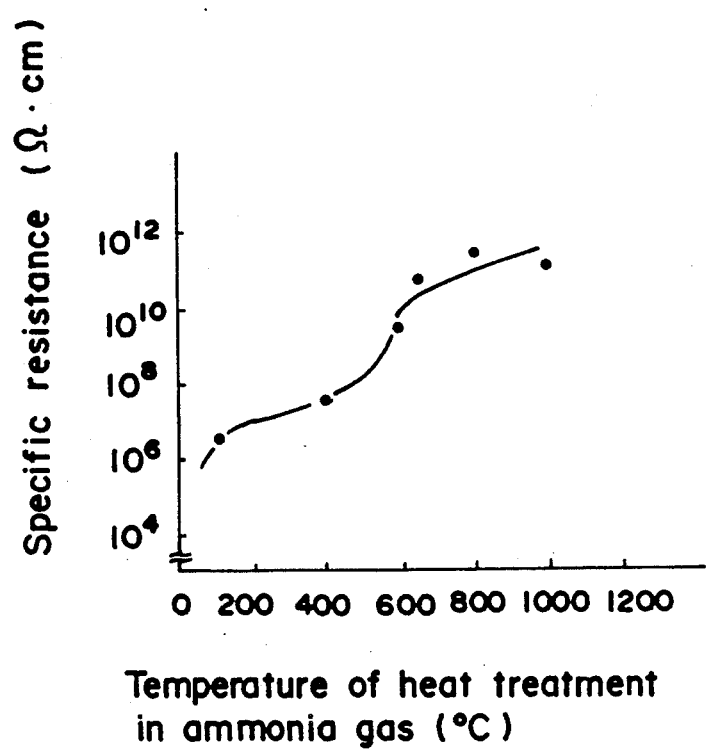
FIG. 4 is a graph showing the relationship between the specific resistance and the temperature of heat treatment in ammonia gas in Example 1.

The three kinds of ceramic fibers so obtained were each subjected to elemental analysis. The results are shown in FIG. 2. Similarly, the results of measurements of the tensile strength and tensile modulus of each of the three kinds of the ceramic fibers are shown in FIG. 3, while those of measurements of the specific resistance of each thereof are shown in FIG. 4.

As is apparent from the results shown in FIG. 2, the ceramic fibers heat treated in ammonia gas at the temperatures exceeding 600° C. exhibited the saturated content of bound nitrogen, and the ceramic fibers heat treated at a temperature of 800° C. or higher in ammonia gas were substantially freed from bound carbon. Furthermore, as is apparent from FIG. 3, the ceramic fibers subjected to the first firing at a temperature exceeding 600° C. had lowered tensile strength and tensile modulus.

EXAMPLE 2

The ceramic fibers obtained in Example 1 were combined with aluminum by a high pressure casting method to produce a fiber-reinforced metal (FRM).

The FRM thus obtained had a percentage fiber volume of 40%, were free from voids, and had excellent adhesion between the fibers and the matrix. The tensile strength and tensile modulus at room temperature of the FRM were 90 to 100 kg/mm$^2$ and 11 to 12 ton/mm$^2$, respectively.

Further, the ceramic fibers were combined with an epoxy resin to produce a fiber-reinforced plastics (FRP).

The relative permittivity of the resultant FRP was measured with the result of 3 to 4 when the percentage fiber volume of the FRP was 55%.

EXAMPLE 3

The same polycarbosilane as that used in Example 1 was melt spun and then made infusible in air at 180° C. for 1 hr to obtain infusible polycarbosilane fibers. The infusible fibers thus obtained were heat treated in ammonia gas (at a flow rate of 200 ml/min) at 450° C. for 2 hr and further heat treated in a gas comprising 5% by volume of hydrogen chloride with the balance being nitrogen (at a flow rate of 2000 ml/min) at 1200° C. for 1 hr to obtain ceramic fibers.

The tensile strength and tensile modulus of the ceramic fibers thus obtained were measured and found to be 300 kg/mm$^2$ and 20 ton/mm$^2$, respectively The ceramic fibers were subjected to elemental analysis with the results that the Si, C, N and O contents were 53.2%, 8.4%, 26.2% and 12.2%, respectively.

The specific resistance of the ceramic fibers was measured and found to be $8 \times 10^6$ Ω·cm. Further, a composite material comprising the ceramic fiber and an epoxy resin (the percentage fiber volume of the composite material: 55%) was prepared, and the relative permittivity and dielectric loss of the composite material were measured and found to be 3.5 and 0.02, respectively.

EXAMPLE 4

The same infusible polycarbosilane fibers as those used in Example 1 were heat treated in a furnace filled with ammonia gas at 600° C. for 1.5 hr and further heat treated in a gas comprising 20% by volume of hydrogen chloride with the balance being nitrogen at 1200° C. for 2 hr to obtain ceramic fibers. The tensile strength and tensile modulus of the ceramic fibers thus obtained were measured and found to be 250 kg/mm$^2$ and 18 ton/mm$^2$, respectively. The ceramic fibers were subjected to elemental analysis with the results that the Si, C, N and O contents were 56.7%, 0.2%, 25,9% and 17.2%, respectively.

The analysis of the ceramic fibers by X-ray diffractometry revealed that the ceramic fibers were amorphous. The specific resistance of the ceramic fibers were measured and found to be $6 \times 10^8$ Ω·cm.

COMPARATIVE EXAMPLE 2

The tensile strength and tensile modulus of commercially available SiC fibers were measured and found to be 300 kg/mm$^2$ and 20 ton/mm$^2$, respectively.

The specific resistance of the ceramic fibers was measured and found to be $7.8 \times 10^3$ Ω·cm. A composite material comprising the ceramic fibers and an epoxy resin (percentage fiber volume of 55%) was prepared, and the relative permittivity and dielectric loss thereof were measured and found to be 5.2 and 0.2, respecively.

COMPARATIVE EXAMPLE 3

The same infusible polycarbosilane fibers as those used in Example 1 were heat treated in a furnace filled with ammonia gas at a temperature rise rate of 100° C./hr until the temperature reached a maximum temperature of 800° C. and further fired in an argon gas atmosphere at a temperature rise rate of 100° C./hr and maintained at a maximum temperature of 1200° C. for 1 hr, thereby obtaining ceramic fibers. The ceramic fibers were subjected to elemental analysis with the results that the ceramic fibers were SiON fibers having Si, C, N, and O contents of 57.2%, 0%, 29.5%, and 13.3%, respectively. The tensile strength and tensile modulus of the ceramic fibers were measured found to be 190 kg/mm$^2$ and 14 ton/mm$^2$, respectively.

The specific resistance of the ceramic fibers was measured and found to be $8.8 \times 10^{10}$ Ω·cm. A composite material comprising the ceramic fibers an epoxy resin (percentage fiber volume of 55%) was prepared, and the relative permittivity and dielectric loss thereof were measured and found to be 3.8 and 0.02, respectively.

Industrial Applicability

As described above, the ceramic fibers of the present invention have excellent mechanical properties equal to those of SiC fibers, high electrical resistance and low relative permittivity comparable to that of SiON fibers, i.e., high radio wave transmission performance, thereby rendering the ceramic fibers of the present invention very suitable for use as reinforcing fibers for a high strength radome structure. Further, the process according to the present invention enables ceramic fibers having excellent properties and comprising a quaternary system composed of Si, C, N, and O to be efficiently produced with a high reproducibility.

We claim:

1. A process of producing ceramic fibers consisting essentially of a quaternary system composed of Si, C, N and O, wherein Si, C, N and O content of the ceramic fibers obtained is Si: 40 to 60% by weight, C: 0.2 to 30% by weight, N: 5 to 30% by weight and O: 5 to 20% by weight, which consists of the steps of: (1) reacting infusible polycarbosilane fibers with ammonia at a temperature of 100° to 450° C. to obtain nitrogen containing fibers and (2) further heat treating said nitrogen-containing fibers in an inert gas at a temperature up to 1,600° C.

2. The process according to claim 1 wherein said infusible polycarbosilane fibers are prepared by reacting polycarbosilane fibers with air or oxygen at a temperature of 50°–400° C. for a period of time up to 10 hours.

3. A process of producing ceramic fibers consisting essentially of a quaternary system composed of Si, C, N and O, which consists of the steps of 1) reacting infusible polycarbosilane fibers with ammonia at a temperature of 100° to 450° C. to obtain nitrogen containing fibers and 2) further heat treating said nitrogen-containing fibers in an inert gas wherein said inert gas contains 1 to 30% by volume of hydrogen chloride.

4. The process according to claim 3 wherein said infusible polycarbosilane fibers are prepared by reacting polycarbosilane fibers with air or oxygen at a temperature of 50°–400° C. for a period of time up to 10 hours.

* * * * *